United States Patent [19]

Press et al.

[11] Patent Number: 4,819,965
[45] Date of Patent: Apr. 11, 1989

[54] FAIL-SAFE BELLOWS ASSEMBLY WITH FLOATING GUARD

[75] Inventors: Irving D. Press, West Orange; Helm A. Rink, North Haledon, both of N.J.

[73] Assignee: Unidynamics Corporation, New York, N.Y.

[21] Appl. No.: 103,950

[22] Filed: Oct. 2, 1987

[51] Int. Cl.[4] ............................................. F16L 55/00
[52] U.S. Cl. ....................................... 285/14; 285/55; 285/93; 285/114; 285/226; 285/351
[58] Field of Search .................... 285/114, 93, 55, 299, 285/300, 301, 226, 229, 13, 14, 351

[56] References Cited

U.S. PATENT DOCUMENTS

| | | | |
|---|---|---|---|
| 1,726,403 | 8/1929 | Giesler | 285/301 X |
| 2,983,961 | 5/1961 | Titterton et al. | 264/506 |
| 3,001,801 | 9/1961 | Downing | 285/13 |
| 3,976,312 | 8/1976 | Murphree | 285/93 X |
| 4,023,832 | 5/1977 | Legille | 285/114 X |
| 4,027,902 | 6/1977 | Tanikawa | 285/114 |
| 4,258,938 | 3/1981 | Davy | 285/93 |

FOREIGN PATENT DOCUMENTS

825464 12/1959 United Kingdom ............... 285/301

*Primary Examiner*—Dave W. Arola
*Attorney, Agent, or Firm*—Brooks Haidt Haffner & Delahunty

[57] ABSTRACT

A fail-safe bellows assembly eliminates the usual limit bolts and replaces them with a cylindrical guard that encircles the bellows element with its associated coupling flanges and interconnects said flanges so as to permit a limited safe magnitude of elongation and articulation. The guard is coupled to both flanges by pins radiating from the flanges that project into apertures in the guard with the apertures lareger than the O.D. of the pins to provide for relative movement of the flanges. A radial gap between the peripheries of the flanges and the guard is filled with a compressible foam layer, and aperture occluders are interposed between foam and guard to prevent extrusion through the apertures of a secondary seal sleeve that bridges the gap between the flanges.

24 Claims, 9 Drawing Sheets

FAIL-SAFE BELLOWS ASSEMBLY WITH FLOATING GUARD

BACKGROUND OF THE INVENTION

The present invention relates to fluid conducting bellows, expansion joints and flexible couplings of the type having spaced apart pipe flanges and a bellows element interconnecting the flanges.

While the present invention has utility in combination with a metal bellows element, its principal application is to bellows elements formed from plastic and/or elastomeric material, and is especially useful with elements formed from polytetrafluoroethylene (PTFE) resin. For simplification of discussion, the expression "bellows assembly" shall be used to designate generically any of the fluid conducting or piping components variously referred to as bellows, expansion joints and flexible couplings.

Bellows assemblies are used in piping systems for various isolation functions, often in association with a pump to isolate the vibration of the latter from the input and output lines. Assemblies having a PTFE bellows element are generally used in piping systems handling caustic or corrosive fluids for which PTFE resin has unique tolerance. However, such use makes it extremely important that gross failure of the bellows element be prevented, or if it cannot be prevented, that some steps be taken to protect personnel and property that might be in the vicinity of a rupturing bellows element.

As a means for minimizing the possibility of bellows failure in use, careful attention has been paid in the past to the use of extreme conservatism in specifying the permissible installation and operating parameters for a given bellows assembly. With flange mounted bellows assemblies it has been customary practice to provide factory installed limit bolts that interconnect the flanges of the bellows assembly and that are secured by lock nuts or the like. In spite of manufacturer admonition to the contrary, installers have been known to remove the limit bolts and subject the bellows assembly to excessive strain in order to bolt it into the plumbing system.

Besides deliberate alteration of the as-manufactured bellows assembly during installation, bellows assemblies are frequently damaged through carelessness or sheer accident between point of manufacture and completion of installation. For example, workers have been known to drop tools on the assemblies or drop the assembly itself where merely a nick in the wrong place can give rise to potential failure.

Aside from faulty installation, there is ever present, for one reason or another, the potential for bellows element failure. For example, there might occur a sudden pressure surge in the line, or the temperature of the fluid might exceed safe limits for the material of which the bellows element is made.

History in the industry has demonstrated that the fears of catastrophic failure are not unfounded. There have occurred numerous failures that have resulted in serious injury to operating personnel.

Thus, the users of such bellows assemblies have resorted to various expedients in an endeavor to improve safety. One expedient takes the form of a piece of fabric that can be wrapped around an installed bellows assembly and is provided with draw strings in opposing hemmed edges for closing the fabric piece at the ends down over the flanges onto the associated pipe sections.

The concept assumes that if the bellows element springs a leak or ruptures, the fabric wrapping will prevent fluid from being sprayed around with the possibility of causing injury. Such solution to a significant problem is, at best, only in the nature of a stop-gap measure. Moreover, the fabric wrapping is not a seal and it is not fully effective when a major failure occurs in the underlying bellows. In addition, the fabric wrapping technique involves covering flanges and bolts and tends to trap vapors which are often corrosive and induce corrosion in the bolts. But since the bolts are covered they are not readily inspected. This problem is of sufficient significance that in some establishments the use of fabric wrapping is actually prohibited.

In the copending application of Irving D. Press. for "A Fail-Safe Bellows Assembly", Ser. No. 07/100,467, filed Sept. 24, 1987, there is described and claimed an arrangement that eliminates the usual limit bolts and replaces them with a cylindrical guard that encircles the bellows element with its associated coupling flanges and interconnects said flanges so as to permit a limited safe magnitude of elongation and articulation. The guard is connected to one of said flanges, with a coupling or linking to the other flange that permits the desired safe freedom of movement. In one embodiment one of the flanges has the guard clamped to its periphery while the other flange couples to the guard with pins and apertures. Another embodiment uses pins projecting radially inwardly from the guard at one end, replacing the pins in the flange and cooperating apertures in the guard.

In addition to the guards, an elastic sleeve is joined to the periphery of each flange with a fluid-tight seal, and a vent passage through one flange interconnects the inter-flange space with the exterior for safe discharge of any fluid escaping from the bellows element.

However, all of the embodiments described in the aforesaid application require either flanges of unequal diameter or a guard cylinder that has a larger diameter at one end than at the other end with a transition therebetween. While the described assemblies are capable of carrying out the desired objective of safety, the construction has been found to be unnecessarily costly and to have other disadvantages.

It is, therefore, an object of the present invention to provide a true fail-safe bellows assembly that is superior to those described in the copending application. As with the earlier application, it is an object to provide a bellows assembly whose safety provisions cannot be defeated by the user and which, if the bellows element should fail, whether it be a pin-hole breach or a catastrophic rupture, will safely carry off the escaping fluid in a rigorously controlled manner. At the same time, it is an object of the invention to provide an indication of a leak at its initial stages when a catastrophic failure of the bellows element has not occurred. It is also an object of the invention to provide enhanced freedom of the bellows element from damage by external means.

With the prior embodiments it was discovered that the secondary seal, upon failure of the bellows element, can, under certain circumstances, be subject to an initial pressure surge sufficient to blow out the seal through the slots in the cylindrical guard or through the clearance gap between flange and guard. While fabric reinforcement of the secondary seal could strengthen the seal sufficiently to prevent blow out, such reinforcement can, under certain circumstances, restrict elastic elongation creating additional problems. Therefore, it is a further object of the present invention to provide a fail-safe bellows assembly in which the secondary seal does not interfere with articulation of the principal bellows element and, yet, is prevented from blowing out under bellows-failure precipitated pressure surges in the inter-flange space.

Another object of the present invention is to provide the desired safeguards in a more economical manner.

SUMMARY OF THE INVENTION

In accordance with the present invention there is provided a fail-safe bellows assembly comprising in combination with first and second spaced apart pipe flanges and a bellows element interconnecting said flanges, a cylindrical substantially rigid, form-stable guard encircling said bellows element and flanges, generally concentric therewith, and means coupling said guard to said flanges for maintaining said guard in position bridging the space between said flanges and at least partially overlapping each flange around the entire periphery thereof while permitting limited movement of said flanges relative to one another, said limited movement being restricted to a safe magnitude to protect said bellows element against excessive elongation and articulation, said means comprising a plurality of apertures formed in said guard and distributed circumferentially thereabout in two annular axially spaced apart arrays, each array overlying the periphery of a different one of said flanges, and a corresponding number of pin-shaped members each mounted at the periphery of one of said flanges, said pin-shaped members being spaced circumferentially about said flanges and each extending radially outwardly through a corresponding one of said apertures.

BRIEF DESCRIPTION OF THE DRAWINGS

The invention will be better understood after reading the following detailed description of the presently preferred embodiments thereof with reference to the appended drawings in which.

The same reference numerals are used throughout the drawings to designate the same or similar parts. Where parts in one embodiment are analogous to parts in another, they are designated by reference numerals differing by a factor of 100 or 200.

DETAILED DESCRIPTION OF THE PRESENTLY PREFERRED EMBODIMENTS

Figure 1A:
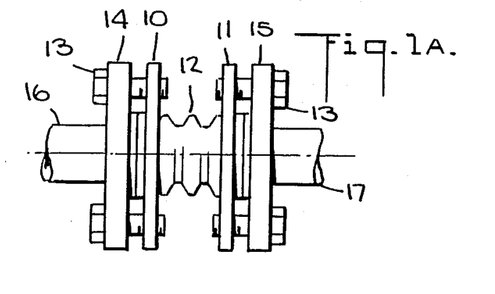
FIG. 1 consists of a series of three illustrations, FIGS. 1A, 1B and 1C, showing the three categories of strain to which a bellows assembly can be subjected and to which it is required to accommodate in a piping installation, namely, axial travel, misalignment and angular deflection.
Figure 1B:
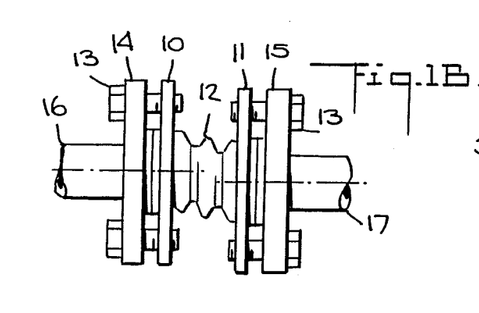
Figure 1C:
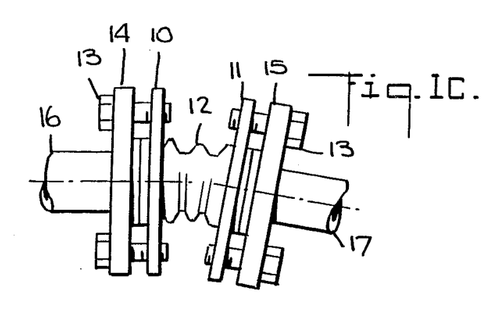

Referring first to FIG. 1A, there is illustrated the basic elements of a bellows assembly as installed between the opposing ends of two sections of pipe. Flanges 10 and 11 joined by bellows element 12 constitute the bellows assembly secured by bolts 13 to pipe flanges 14 and 15 on respective pipe sections 16 and 17. FIG. 1A is intended to illustrate accommodation on the part of the bellows 12 that involves axial travel, i.e., approach and separation of flanges 10 and 11, while maintaining parallelism centered on a common axis. In FIG. 1B, the same bellows assembly is shown accommodating pipe end misalignment wherein the flanges remain parallel but centered on laterally offset axes. In FIG. 1C, the accommodation is to angular deflection wherein the flanges depart from parallelism. The illustration of each of FIGS. 1A, 1B and 1C is of a simple example of the particular relationship. However, in real life the various relationships are generally combined so that compound strain is applied to the bellows assembly. Moreover, these examples are limited to steady state conditions and cannot illustrate the dynamic strains to which the bellows 12 is subjected in use. Such dynamic strains may involve internal pressure fluctuations, vibrational motion between the interconnected pipe sections, and/or thermal expansion and contraction of the pipe sections and associated plumbing.

The illustrations in FIGS. 1A, 1B and 1C are based on bellows with three convolutions. However, throughout the entire specification it should be understood that the number of convolutions shown is intended to be illustrative only. The triple convolute bellows shown in FIG. 1 are convenient for illustrating the stress parameters while the number of convolutes provided in the various embodiments of the invention are dictated by the requirements for the particular bellows assembly and can be varied in known manner as desired.

Because it underscores the value of the present invention, it will be described with reference to a piping system consisting of metal pipe, generally steel, lined with PTFE and capable of handling dangerous fluids.

The lining of such pipe usually extends axially outwardly of the metal pipe where it is flared radially outwardly over the face of the corresponding flange. The flared portion of the lining thus provides a gasket for compression and seal development between said corresponding flange and a mating flange to which it is bolted.

Referring to FIGS. 2 to 5, there is illustrated a first embodiment of the bellows assembly constructed in accordance with the present invention. The bellows assembly, designated generally by the reference numeral 20, is intended to be inserted between confronting flanges in a metal piping system that has been lined with PTFE resin. Only so much of the associated piping, such as pipe 117, its lining 22, and its connecting flange 115, is shown in the drawings as is believed necessary to show the interrelationship of the assembly 20 to the piping.

The bellows assembly 20 consists of spaced apart pipe flanges 24 and 25 interconnected by a bellows element 26, the latter having been molded from PTFE resin with an external metal reinforcing ring 27 using any suitable method such as that described in Titterton et al. U.S. Pat. No. 2,983,961. The flanges 24 and 25 are each provided with suitable threaded bolt holes 28 distributed in conventional manner thereabout.

Figure 2:
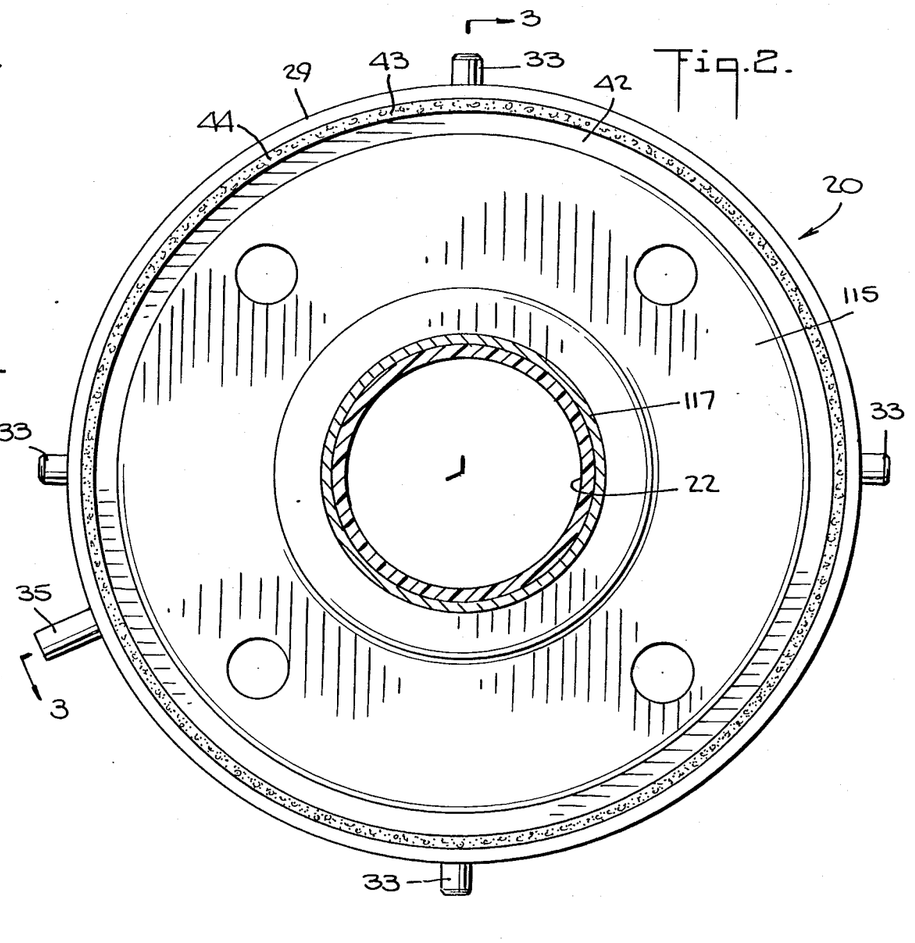
FIG. 2 is an elevational view, with portions in section, of one embodiment of the present invention, as viewed looking along a pipe run toward the bellows assembly.
Figure 4:
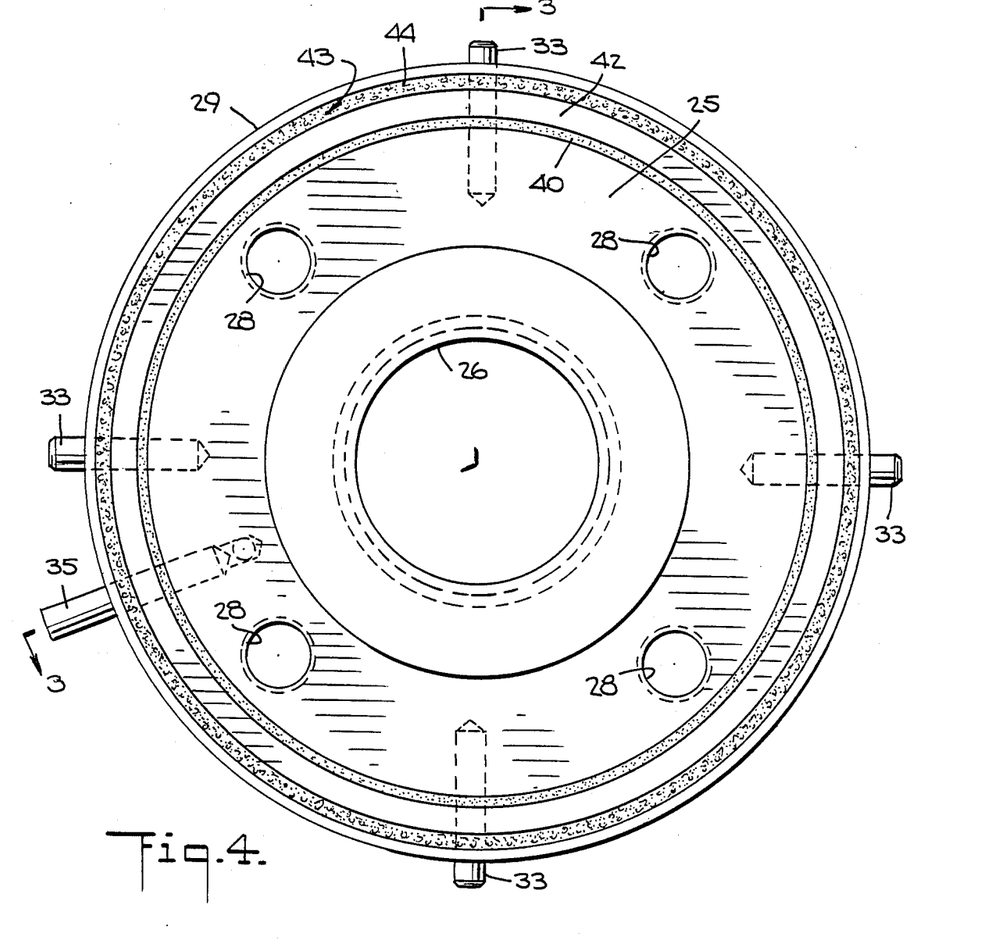
FIG. 4 is a transverse sectional view taken along the line 4—4 in FIG. 3.
Figures 5, 6:
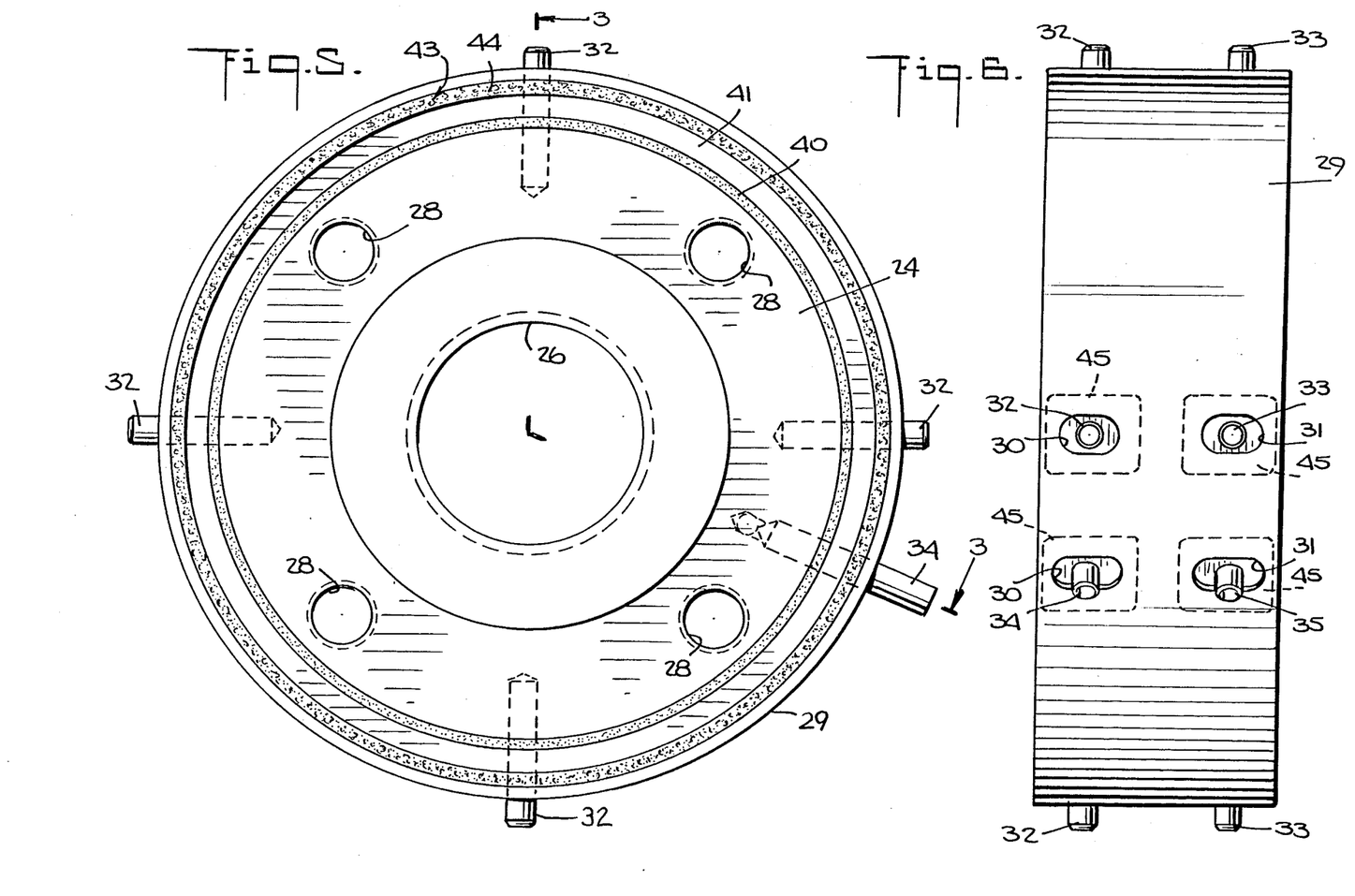
FIG. 5 is a transverse sectional view taken along the line 5—5 in FIG. 3.
FIG. 6 is an elevational view with portions broken away of the embodiment of FIG. 3.

A cylindrical substantially rigid form-stable guard 29, for example, of metal, is provided encircling the bellows element 26 and flanges 24 and 25, generally concentric therewith. In this embodiment the guard has a uniform diameter throughout its axial extent. As best seen in FIG. 6, the guard 29 is provided with a plurality of apertures, 30 or 31, formed in the guard and distributed circumferentially thereabout in two annular axially spaced apart arrays, one array containing apertures 30 and the other array containing apertures 31, each array overlying the periphery of a different one of the flanges 24 and 25. A corresponding number of pin-shaped members, 32 and 33, are each mounted at the periphery of one of the flanges, the pin-shaped members being spaced circumferentially about the flanges 24, 25 and each extending radially outwardly through a corresponding one of the apertures 30, 31. As seen in FIGS. 2, 4 and 5, there are four equi-distantly spaced pin-shaped members 32 and 33, respectively, per flange. In addition, a vent passage is provided by hollow pin elements 34 and 35 extending through corresponding apertures 30 and 31 into the underlying flange 24 and 25 and communicating with bore 36 or 37 and cross passage 38 or 39, respectively. The vent passages are located between a solid pin shaped member 32 or 33 and an adjacent bolt hole 28.

Figure 3:
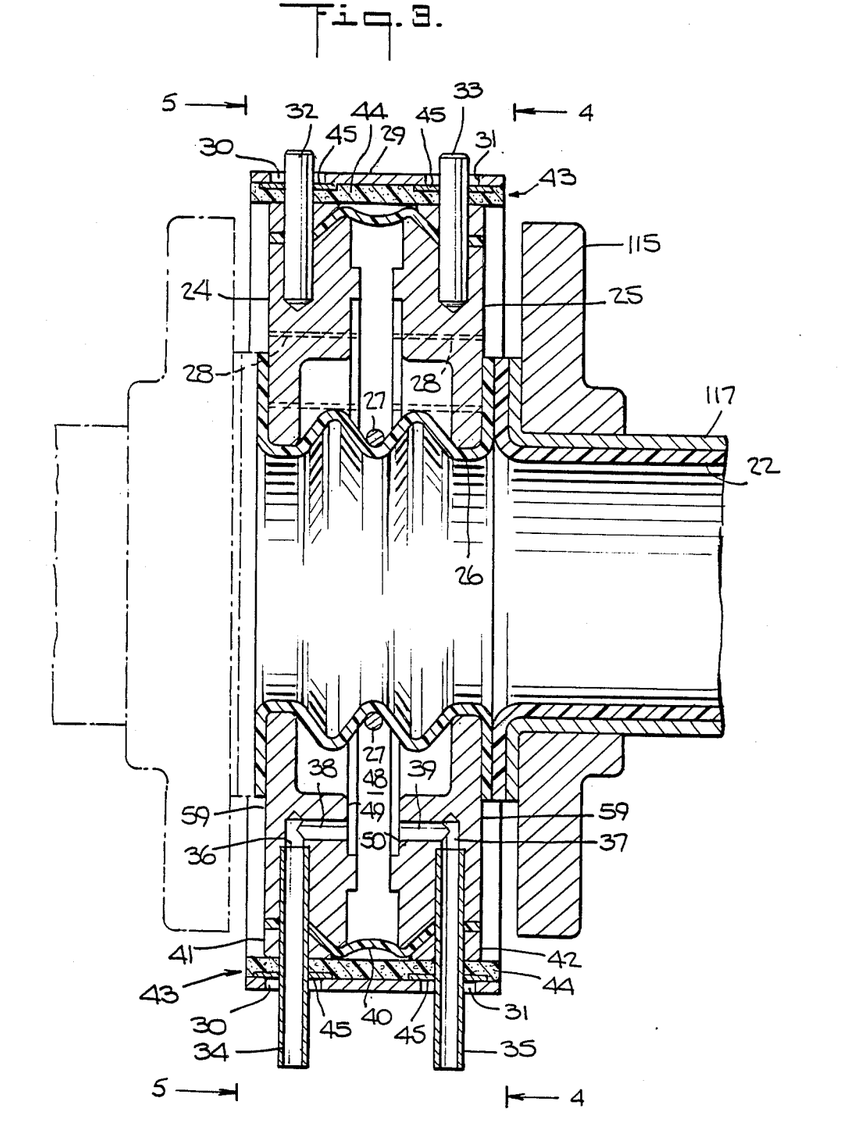
FIG. 3 is a longitudinal sectional view of the embodiment of FIG. 2, taken along the line 3—3 in FIG. 2.

Each flange, 24 and 25, has a shaped perimeter for receiving a slightly corrugated secondary seal sleeve 40 of elastomeric material whose axial ends are clamped to the flange periphery by complemental clamp rings 41 and 42 through which the members 32, 33, 34 and 35 pass radially inwardly into respective flanges 24 and 25.

Figure 7:
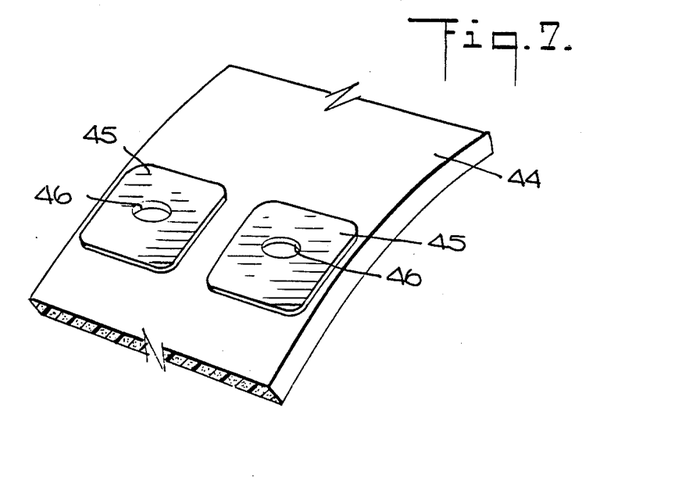
FIG. 7 is a fragmentary perspective view of the sponge layer and aperture occluders utilized in the embodiment of FIGS. 2 to 6.

In order to provide for pipe end misalignment and effective increase in diameter upon angular deflection, the inside diameter of guard 29 is made larger than the outside diameter of clamp rings 41 and 42 by a predetermined amount represented by clearance 43. To prevent rattling of the guard 29 and for more significant reasons to be explained, the clearance 43 is filled with a layer of sponge material 44 on the outer surface of which is provided a thin, generally oblong, piece of metal or other comparatively inelastic, inflexible rigid material 45 having a central aperture 46 through which passes with a close fit either the pin-shaped member 32 or 33 or the hollow pin elements 34 or 35. The piece 45 is shaped to conform to the inside surface of guard 29 and is dimensioned to cover, for all practical purposes, the overlying aperture 30 or 31 for all positions of the associated component 32, 33, 34 or 35, about which it is disposed collar-like. Thus, the piece 45 functions as an aperture occluder for apertures 30 and 31.

Sponge layer 44 should be sufficiently elastic and compressible to accommodate the full range of permissible safe articulation for which the bellows assembly is designed. Any suitable foam material can be used.

While the guard 29 will always bridge the space between the flanges 24 and 25, and therefore can bar radial projection of escaping fluid if the bellows element 26 should fail, gross area discharge can still be anticipated through clearance 43 over the flange 24 or 25. To avoid this happening and provide for more satisfactory control, the secondary seal means in the form of the elastic sleeve 40 is disposed between the flanges 24 and 25 surrounding the bellows element 26 for cooperation with the vent passage that includes the bore through pins 34 and 35. This arrangement provides for controlled discharge of any fluid entering the space 48 between the flanges 24 and 25 upon catastrophic rupture or lesser failure or breach of element 26.

As explained in the aforesaid pending application, the elastic sleeve 40 is formed from a suitable elastomeric material with sufficient flexibility and elasticity to accommodate the limited movement permitted to the flanges 24 and 25. In the present embodiment, the slight corrugation provides for elongation while reducing stress on the clamped ends of sleeve 40. It also enables use, if desired, of a relatively strong material that does not necessarily have too much elasticity. For the assembly to afford protection, the seal sleeve 40 must resist rupture or blowing out through the clearance gap 43. The significance of the aperture occluders 45 should now be apparent. They serve to cover the apertures 30 and 31 preventing extrusion of the sponge 44 and sleeve 40 through an aperture. In this way, the sleeve 40 can be designed to withstand any sudden pressure rise upon a catastrophic burst of bellows 26 for a time sufficient to permit the fluids to be bled off through the vent passages.

Summarizing, it will be seen that the vent passage comprises the bores through the pin elements 34 and 35 communicating with the interconnecting bores 36, 37, 38 and 39, as shown in the drawings. The cross passages 38 and 39 communicate, respectively, with the faces 49 and 50 of flanges 24 and 25, which faces confront space 48. It is intended that the bellows assembly 20 should be installed in a piping system oriented with the pin elements 34 and 35 either directed downward or in a safe or protected direction, or with the elements 34 and 35 connected to drain lines for safely conducting off any discharge.

Figures 8, 9, 10:
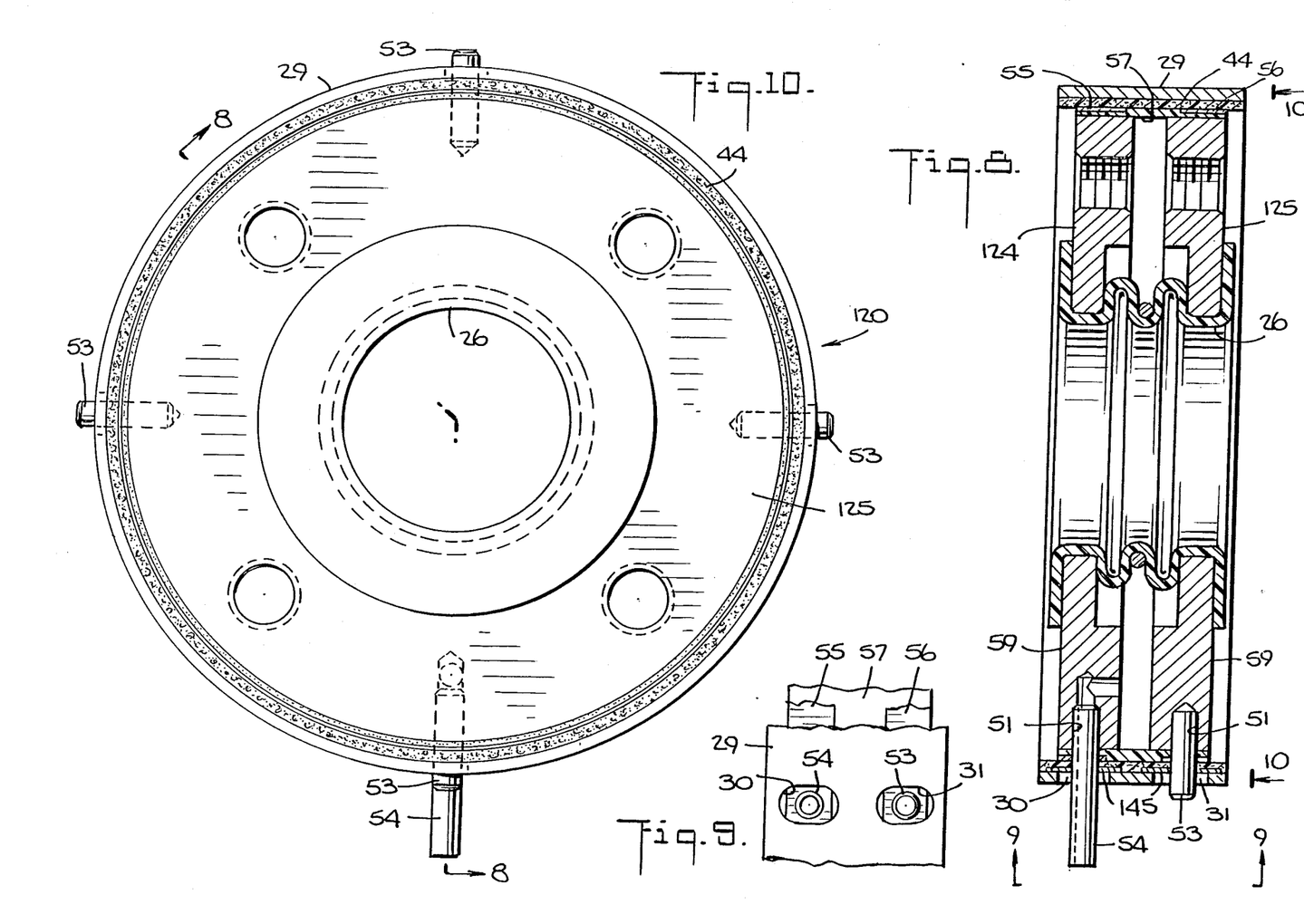
FIG. 8 is a sectional view similar to the view of FIG. 3, but showing another embodiment of the invention, somewhat more rudimentary, which uses flanges described in said copending application.
FIG. 9 is a fragmentary view taken along line 9—9 in FIG. 8.
FIG. 10 is an elevational view of the embodiment of FIG. 8 as seen from the righthand side of FIG. 8 looking in the direction of the arrows 10—10.

The embodiment described with reference to FIGS. 2 to 7 has certain advantages. However, if it should be deemed unnecessary to employ the specially contoured flanges 24 and 25 with a corrugated sleeve 40, resort can be had to the embodiment illustrated in FIGS. 8 to 10 to which attention should now be directed. The bellows assembly is designated generally by the reference numeral 120. The flanges 124 and 125 and the bellows element 26 are the same as described in the aforesaid copending application with reference to FIGS. 6 to 12 therein. However, guard 29, foam layer 44 and aperture occluders 145 can be the same as described above with reference to the present FIGS. 2 to 7. Pins 53 fitted in the bores 51 of flanges 124 and 125, with the exception of the one hollow pin 54 in the flange 124, as shown, pass through corresponding apertures 30 and 31, through aperture occluders 145, through metallic band-like members, 55 and 56, and through the sleeve 57 into the respective flanges. Band-like members 55 and 56 clamp the elastic sleeve 57 down against the periphery of the corresponding flange 124 or 125 which periphery is provided with a series of annular barbs not shown in the drawings. The guard 29 is free to float relative to the flanges 124 and 125. It will be understood that more than one vent passage can be provided and that the vent passage can be offset angularly from the quadrature location in order that an additional solid pin can be accommodated.

Although not shown in the drawings, flanges 24, 124, 25 and 125 are preferably provided on the face 59, which is overlapped by the flares of the bellows 26, with a plurality of circular grooves to ensure an adequate grip on the flares of the bellows element to resist pulling out when the flanges 24, 25 or 124, 125 are drawn apart in an installation, putting tension on bellows 26.

In the embodiments described above the pin-shape members mounted in each flange are aligned in pairs axially of the assembly. Moreover, in the embodiment of FIG. 3 each flange is provided with its own vent passage. However, such symmetry has certain disadvantages. For example, having a drain tube or fitting in both flanges of the bellows assembly requires the user to make two separate drain connections. The aligned pin and slot arrangement gives rise to interference between the aperture occluders when certain size bellows are placed in compression.

Reference should now be directed to FIGS. 11 to 15 wherein a modified embodiment is illustrated that overcomes the foregoing mentioned disadvantages. The bellows assembly is designated generally by the reference numeral 300. As with the previous embodiments, this assembly is intended to be inserted between confronting flanges in a metal piping system that has been lined with PTFE resin.

The bellows assembly 300 consists of spaced apart pipe flanges 301 and 302 interconnected by a bellows element 303, similar to bellows 26 in the prior embodiments. The flanges 301 and 302 are each provided with suitable threaded bolt holes 305 distributed in conventional manner thereabout. See FIG. 11.

Figure 11:
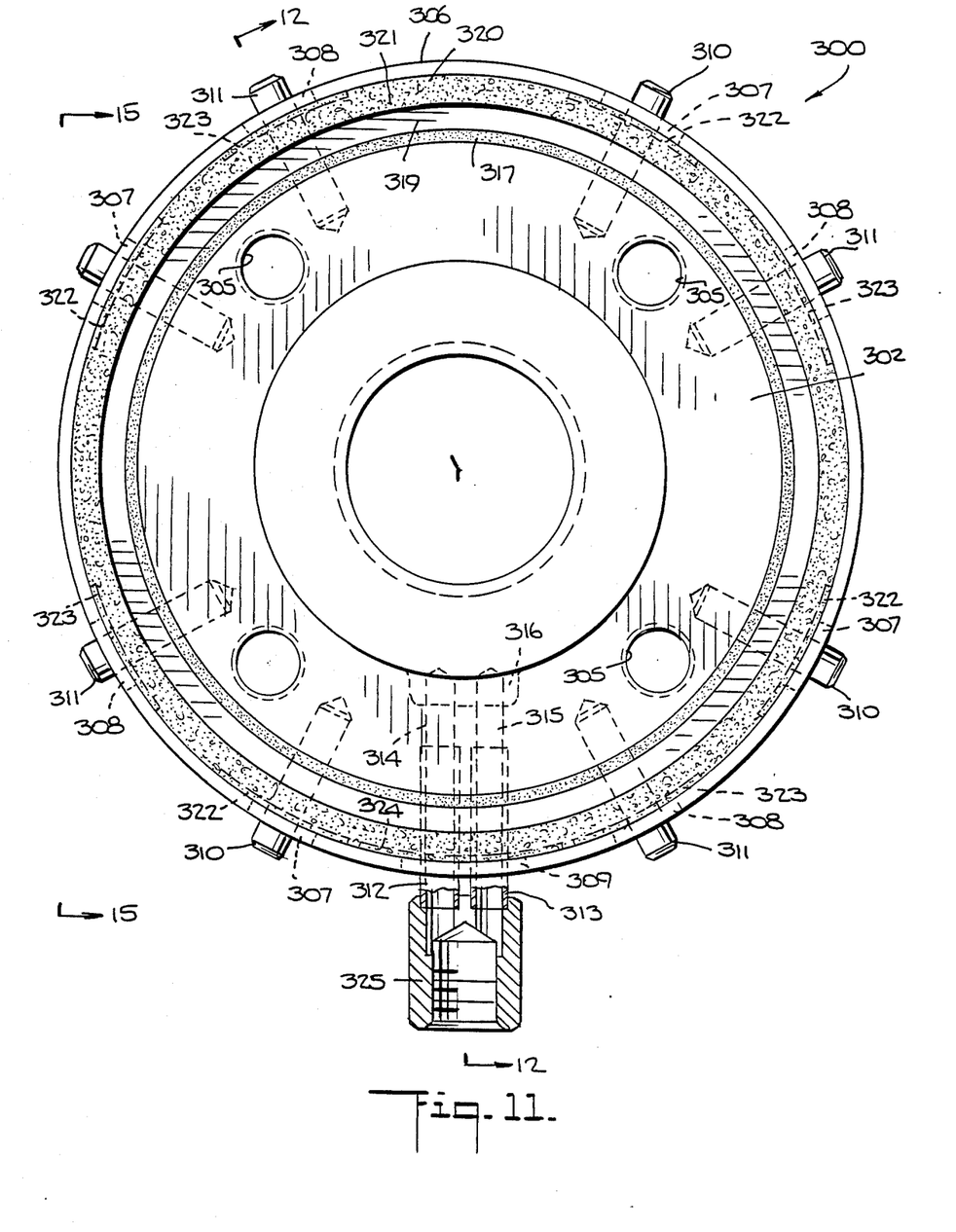
FIG. 11 is an elevational view similar to FIG. 4, but showing a presently preferred embodiment of the invention.
Figure 15:
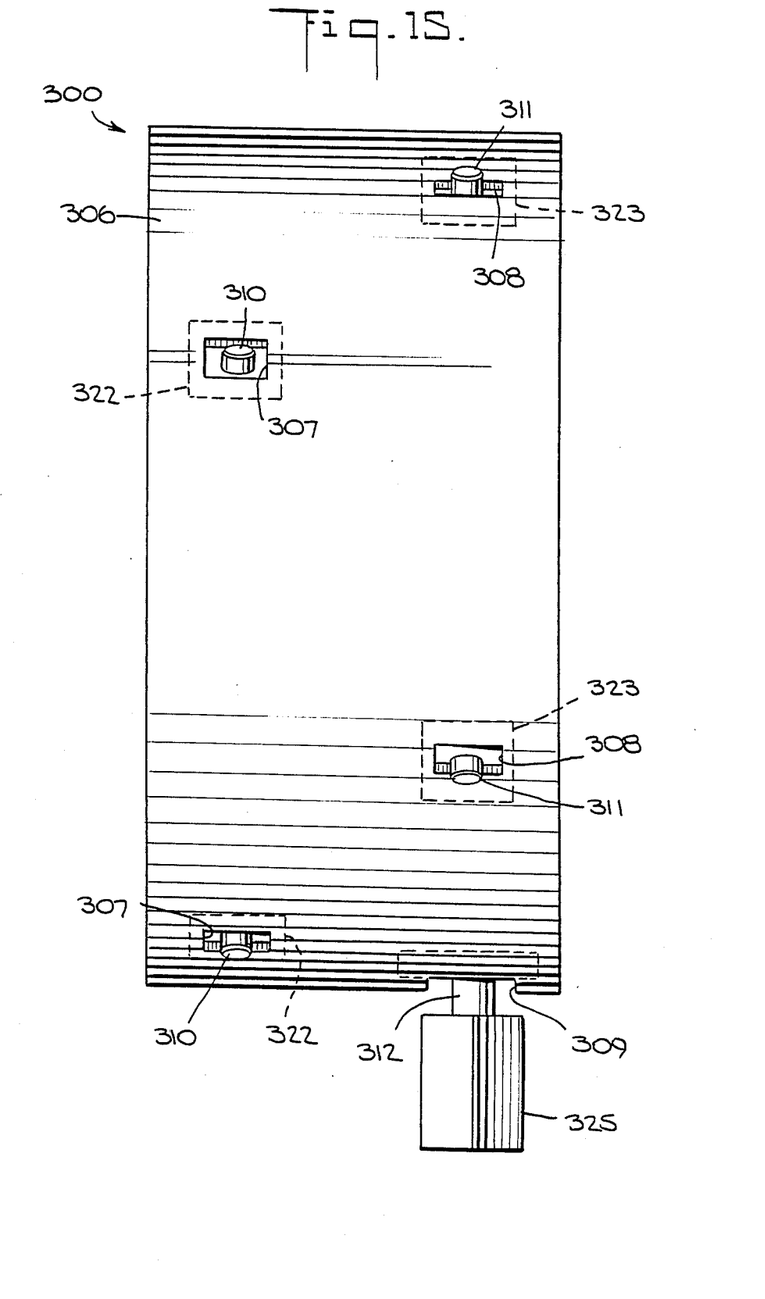
FIG. 15 is a side elevational view of the embodiment of FIG. 11, as seen in the direction of the arrows 15—15 in FIG. 11.

A cylindrical substantially rigid form-stable guard 306, for example, of metal, is provided encircling the bellows element 303 and flanges 301 and 302, generally concentric therewith. The guard has a uniform diameter throughout its axial extent. As best seen in FIG. 15, the guard 306 is provided with a plurality of apertures 307, 308 and 309, formed in the guard and distributed circumferentially thereabout in two annular axially spaced apart arrays, one array containing apertures 307 and the other array containing apertures 308 and 309, each array overlying the periphery of a different one of the flanges 301 and 302. Unlike the previously described embodiments, however, the apertures 307 are located angularly displaced or shifted from the location of apertures 308 and 309 so that no two apertures lie on a common element of the cylindrical guard 306. This is best seen in FIGS. 11 and 15.

A corresponding number of pin-shaped members, 310 and 311 are each mounted at the periphery of one of the flanges, the pin-shaped members being spaced circumferentially about the flanges 301 and 302 and each extending radially outwardly through a corresponding one of the apertures 307 and 308. As seen in FIGS. 11 and 15, there are four equi-distantly spaced pin-shaped members 310 and 311, respectively, per flange, but as between the two flanges, the pin-shaped members are circumferentially displaced by about 30°. In addition, a vent passage is provided in one of the flanges, here the flange 302, by a pair of hollow pin elements 312 and 313 extending, side-by-side, through the aperture 309 into the underlying flange and communicating with bores 314 and 315 that open into a notch or cavity area 316. The vent passage as seen in FIG. 11 is located conveniently between solid pin-shaped members.

Figure 12:
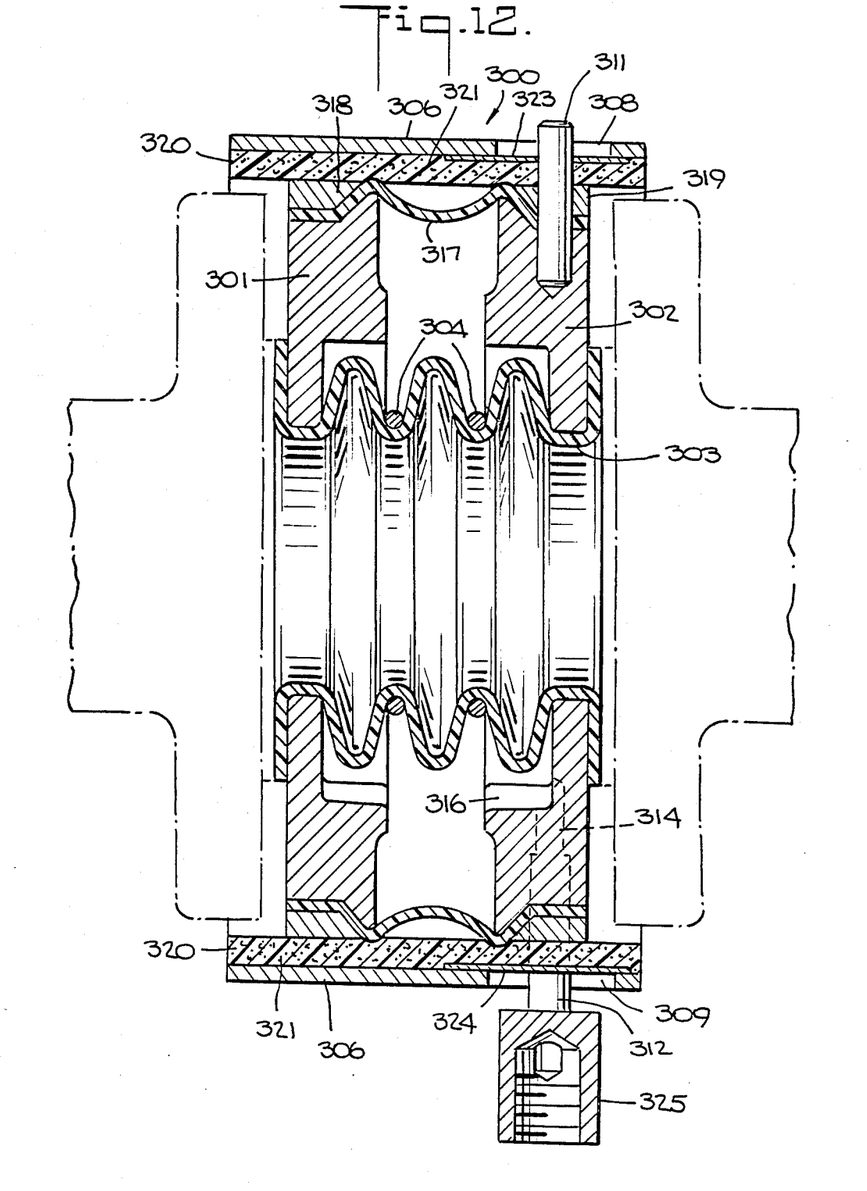
FIG. 12 is a longitudinal sectional view of the embodiment of FIG. 11, taken along the line 12—12 in FIG. 11.

Each flange, 301 and 302, has a shaped perimeter for receiving the slightly corrugated secondary seal sleeve 317 of elastomeric material whose axial ends are clamped to the flange periphery by complemental clamp rings 318 and 319 through which pass the members 310, 311, 312 and 313 radially inwardly into respective flanges 301 and 302.

As with the previously described embodiments, the gap 320 between guard 306 and rings 318 and 319 is filled with a layer of sponge material 321 on the other surface of which is adherently provided the aperture occluders 322, 323 and 324, the latter surrounding the vent tubes 312 and 313. An aperture occluder 322 is provided for each pin 310 and an occluder 323 for each pin 311. As best seen in FIG. 15, the aperture occluders 322, 323 and 324 are staggered sufficiently such that they do not interfere with contraction of the bellows.

Figure 13:
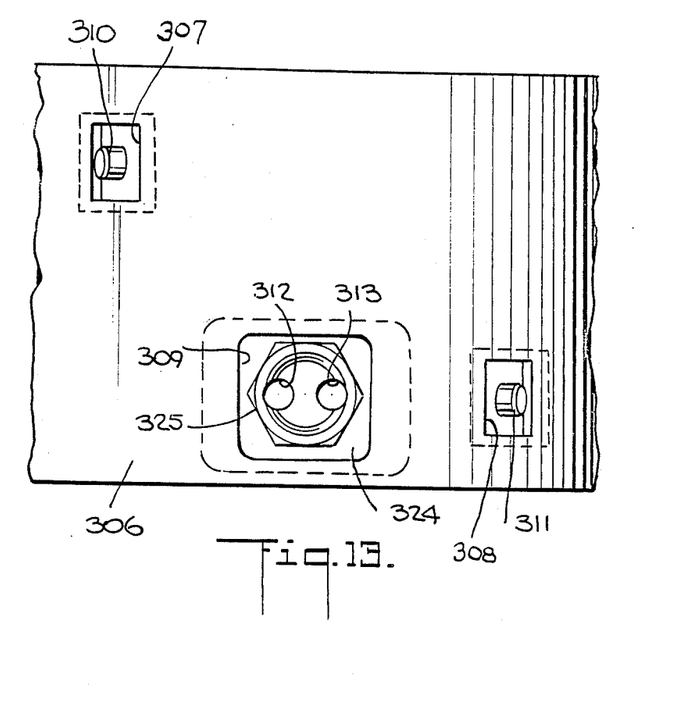
FIG. 13 is a fragmentary view of the bottom of the assembly of FIG. 11 showing details of the vent fitting and the associated aperture in the guard element.

As best seen in FIGS. 11, 12 and 13, a single adapter fitting 325 is joined to hollow elements 312 and 313 so that only one standard connection need be made thereto by the user for providing a drain.

Figure 14:
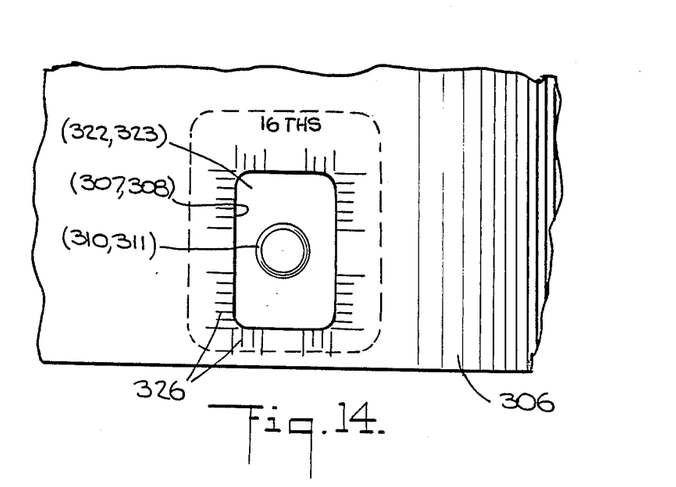
FIG. 14 is a fragmentary view of the assembly of FIG. 11 showing details of a typical aperture and pin arrangement in the guard element with indicia for indicating extent of bellows assembly departure from neutral position.

Another feature is illustrated in FIG. 14 wherein the border 326 around one of the apertures, here the aperture 307, is marked with indicia, e.g., lines at 1/16" interval. When a bellows assembly 300 is installed in a piping system, a straight edge placed against the pin 310, for example, will align with one of the indicia marks indicating the amount of departure from neutral. FIG. 14 is typical of the markings applied to all of the apertures.

Having described the presently preferred embodiments of the invention, it is to be understood that various changes in construction can be effected by those skilled in the subject art without departing from the true spirit of the invention as defined in the appended claims.

What is claimed is:

1. A fail-safe bellows assembly comprising in combination with first and second spaced apart pipe flanges and a bellows element interconnecting said flanges, a cylindrical substantially rigid, form-stable guard completely encircling said bellows element and flanges, generally concentric therewith, and means coupling said guard to said flanges for maintaining said guard in position bridging the space between said flanges and at least partially overlapping each flange around the entire periphery thereof while permitting limited movement of said flanges relative to one another, said limited movement being restricted to a safe magnitude to protect said bellows element against excessive elongation and articulation, said means comprising a plurality of apertures formed in said guard and distributed circumferentially thereabout in two annular axially spaced apart arrays, each array overlying the periphery of a different one of said flanges, and a corresponding number of pin-shaped members each mounted at the periphery of one of said flanges, said pin-shaped members being spaced circumferentially about said flanges and each extending radially outwardly through a corresponding one of said apertures.

2. A fail-safe bellows assembly according to claim 1, wherein said flanges have substantially the same outside diameter, said guard has a larger inside diameter than said flanges, and the space between said guard and said flange peripheries contains a layer of elastomeric sponge material.

3. A fail-safe bellows assembly according to claim 2, wherein said transverse apertures in the guard are sufficiently larger than the outside transverse dimensions of the corresponding pin-shaped members to permit and establish said limited movement between said flanges.

4. A fail-safe bellows assembly according to claim 3, wherein secondary seal means is disposed within said cylindrical guard in fluid sealing relationship between said two flanges surrounding said bellow element and defining an enclosed space between said bellows element and said secondary seal means, a vent passage establishing communication between said enclosed space and the exterior of said bellows assembly, said secondary seal means cooperating with said vent passage to provide controlled discharge of any fluid entering said enclose space between said flanges of said bellows element.

5. A fail-safe bellows assembly according to claim 4, wherein said secondary seal means comprises an elastic sleeve joined at opposite ends to a respective one of said flanges for enclosing said enclosed space between said flanges while accommodating said limited movement of said flanges.

6. A fail-safe bellows assembly according to claim 5, wherein said elastic sleeve is secured to and about the periphery of the respective flange in fluid sealing engagement therewith.

7. A fail-safe bellows assembly according to claim 6, wherein said vent passage is constituted at least in part by a through bore passing through one of said pin-shaped members.

8. A fail-safe bellows assembly according to claim 7, wherein said vent passage comprises two of said pin-shaped members each with a through bore and both mounted side-by-side on the same flange and passing through a common aperture in said guard.

9. A fail-safe bellows assembly according to claim 7, wherein said vent passage comprises a through bore passing through one of said pin-shaped members mounted on each of said flanges.

10. A fail-safe bellows assembly according to claim 9, wherein an aperture occluder in the form of a layer of substantially inelastic, inflexible material is interposed surrounding each of said pin-shaped members between said elastic sleeve and said guard for preventing extrusion of elastomeric material through any of said apertures in said guard.

11. A fail-safe bellows assembly according to claim 10, wherein said aperture occluders each comprise a comparatively thin-gauge oblong metallic piece surrounding collar-like a respective one of said pin-shaped members and formed to substantially conform to the radially inner surface of said guard.

12. A fail-safe bellows assembly according to claim 5, wherein an aperture occluder in the form of a layer of substantially inelastic, inflexible material is interposed surrounding each of said pin-shaped members between said elastic sleeve and said guard for preventing extrusion of elastomeric material through any of said apertures in said guard.

13. A fail-safe bellows assembly according to claim 12, wherein said aperture occluders each comprise a comparatively thin-gauge oblong metallic piece surrounding collar-like a respective one of said pin-shaped members and formed to substantially conform to the radially inner surface of said guard.

14. A fail-safe bellows assembly according to claim 2, wherein secondary seal means is disposed within said cylindrical guard in fluid sealing relationship between said two flanges surrounding said bellows element and defining an enclosed space between said bellows element and said secondary seal means, a vent passage establishing communication between said enclosed space and the exterior of said bellows assembly, said secondary seal means cooperating with said vent passage to provide controlled discharge of any fluid entering said enclosed space between said flanges of said bellows element.

15. A fail-safe bellows assembly according to claim 14, wherein an aperture occluder in the form of a layer of substantially inelastic, inflexible material is interposed surrounding each of said pin-shaped members between said elastic sleeve and said guard for preventing extrusion of elastomeric material through any of said apertures in said guard.

16. A fail-safe bellows assembly according to claim 15, wherein said aperture occluders each comprise a comparatively thin-gauge oblong metallic piece surrounding collar-like a respective one of said pin-shaped members and formed to substantially conform to the radially inner surface of said guard.

17. A fail-safe bellows assembly according to claim 14, wherein said secondary seal means comprises an elastic sleeve joined at opposite ends to a respective one of said flanges for enclosing said enclosed space between said flanges while accommodating said limited movement of said flanges.

18. A fail-safe bellows assembly according to claim 17, wherein an aperture occluder in the form of a layer of substantially inelastic, inflexible material is interposed surrounding each of said pin-shaped members between said elastic sleeve and said guard for preventing extrusion of elastomeric material through any of said apertures in said guard.

19. A fail-safe bellows assembly according to claim 18, wherein said aperture occluders each comprise a comparatively thin-gauge oblong metallic piece surrounding collar-like a respective one of said pin-shaped members and formed to substantially conform to the radially inner surface of said guard.

20. A fail-safe bellows assembly according to claim 1, wherein secondary seal means is disposed within said cylindrical guard in fluid sealing relationship between said two flanges surrounding said bellows element and defining an enclosed space between said bellows element and said secondary seal means, a vent passage establishing communication between said enclosed space and the exterior of said bellows assembly, said secondary seal means cooperating with said vent passage to provide controlled discharge of any fluid entering said enclosed space between said flanges of said bellows element.

21. A fail-safe bellows assembly according to claim 20, wherein said vent passage is constituted at least in part by a through bore passing through one of said pin-shaped members.

22. A fail-safe bellows assembly according to claim 21, wherein said vent passage comprises two of said pin-shaped members each with a through bore and both mounted side-by-side on the same flange and passing through a common aperture in said guard.

23. A fail-safe bellows assembly according to claim 22, wherein said flanges have substantially the same outside diameter, said guard has a larger inside diameter than said flanges, and the space between said guard and said flange peripheries contains a layer of elastomeric sponge material.

24. A fail-safe bellows assembly according to claim 23, wherein an aperture occluder in the form of a layer of substantially inelastic, inflexible material is interposed surrounding each of said pin-shaped members individually with the exception of said members that have a through bore, the latter being surrounded by one of said occluders collectively, said occluders being disposed between said elastic sleeve and said guard for preventing extrusion of elastomeric material through any of said apertures in said guard.

* * * * *